(12) United States Patent
Terada

(10) Patent No.: US 6,429,366 B1
(45) Date of Patent: Aug. 6, 2002

(54) DEVICE AND METHOD FOR CREATING AND REPRODUCING DATA-CONTAINING MUSICAL COMPOSITION INFORMATION

(75) Inventor: Kosei Terada, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 09/357,050

(22) Filed: Jul. 19, 1999

(30) Foreign Application Priority Data

Jul. 22, 1998 (JP) ............................................. 10-206723

(51) Int. Cl.[7] ................................................ G10H 7/00
(52) U.S. Cl. ........................ 84/645; 84/601; 434/307 A
(58) Field of Search ........................ 84/609, 634, 645, 84/601, 464 R, 464 A; 434/307 A

(56) References Cited

U.S. PATENT DOCUMENTS

| | | | | |
|---|---|---|---|---|
| 5,119,711 A | * | 6/1992 | Bell et al. | 84/645 X |
| 5,569,869 A | * | 10/1996 | Sone | 84/645 X |
| 5,589,947 A | * | 12/1996 | Sato et al. | 84/645 X |
| 5,675,100 A | * | 10/1997 | Hewlett | 84/645 X |
| 5,705,762 A | * | 1/1998 | Kang et al. | 84/645 X |
| 5,734,118 A | * | 3/1998 | Ashour et al. | 84/609 |
| 5,770,811 A | | 6/1998 | Haino | |
| 5,886,274 A | * | 3/1999 | Jungleib | 84/601 |
| 6,069,310 A | * | 5/2000 | James | 84/645 |
| 6,137,047 A | * | 10/2000 | Sugiyama | 434/307 A X |

* cited by examiner

Primary Examiner—Jeffrey Donels
(74) Attorney, Agent, or Firm—Morrison & Foerster LLP

(57) ABSTRACT

To musical composition information such as a standard MIDI file, there are added accessory data, such as message or text data, and setting information for the accessory information which are both unrelated to the musical composition information. These accessory data and setting information are inserted, as meta events, in the standard MIDI file. In this way, a musical composition information file can be created which is an integral combination of the musical composition information and the accessory data containing the setting information. The musical composition information file with the accessory data can be transmitted or received via a communication network, or stored in a recording medium for portability. The musical composition information file can be reproduced to permit simultaneous execution of performance reproduction processing and image reproduction processing such as for display of a message.

56 Claims, 7 Drawing Sheets

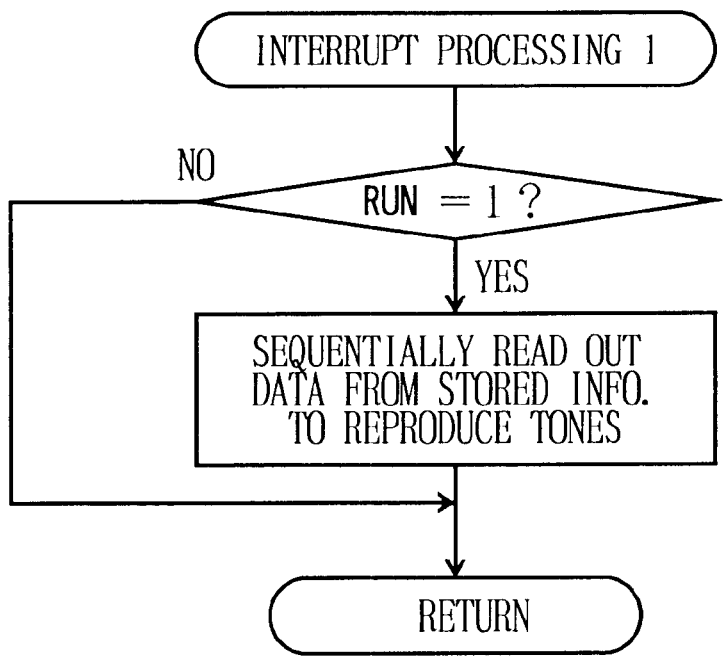
F I G. 7A
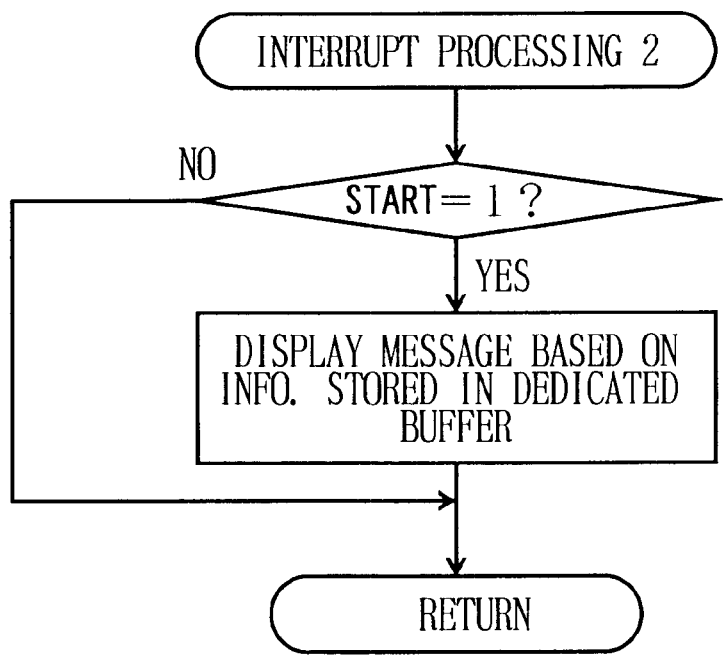
F I G. 7B

DEVICE AND METHOD FOR CREATING AND REPRODUCING DATA-CONTAINING MUSICAL COMPOSITION INFORMATION

BACKGROUND OF THE INVENTION

The present invention relates to a device for creating data-containing musical composition (i.e., music piece) information which simultaneously enables a music performance based on a MIDI file and other processing such as display of a message, a transmission/reception system for transmitting/receiving the musical composition information, a reproduction device for reproducing the musical composition information, and a recording medium storing the musical composition information.

When musical composition information (typically a MIDI file) is to be transmitted by e-mail or the like, it has been customary to attach the MIDI file to the body of the e-mail message (message text file). For this purpose, the MIDI file is first encoded into a text file, and then the thus-encoded MIDI text file is attached to and transmitted with the message text file. At an receiving end, the MIDI text file is extracted from the received message text file and the extracted MIDI text file is decoded to reproduce the original MIDI file. The thus-reproduced MIDI file is stored into a predetermined folder, and it is then processed by a MIDI reproduction application so as to concurrently execute a music performance based on the MIDI file and other processing such as display of messages and other textual information.

It has also been known to display messages and the like simultaneously with execution of a music performance based on a MIDI file by viewing, via a browser, predetermined WWW (World Wide Web) pages created using a MIDI file and message text file. In this case, the URL of the pages in question must be transmitted, via e-mail or otherwise, to a party requesting the messages because it is necessary for the requesting party to access the pages.

However, in the first-mentioned case where the MIDI file is attached to and transmitted with the message text file via e-mail, these two files must be reproduced using different application software, which would be very burdensome. In the second-mentioned case where predetermined WWW pages are used, the WWW pages must be created, one by one, in such a manner that they can associate the message display with the performance processing. Further, because the message text file and the MIDI file exist separately in the created pages, management and handling of the files tend to be very difficult and burdensome. In addition, the message-requesting party has to access each one of the predetermined WWW pages, in order to display the messages and listen to the music performance.

SUMMARY OF THE INVENTION

It is therefore an object of the present invention to provide a device for creating data-containing musical composition information which enables simultaneous execution of music performance processing based on a MIDI file and data processing such as display of a message, a reproduction device for reproducing the data-containing musical composition information, a transmission/reception system for transmitting/receiving the data-containing musical composition information, and a recording medium storing the data-containing musical composition information.

To accomplish the above-mentioned object, the present invention provides a device for creating data-containing musical composition information, which comprises: a composition information supply section that supplies musical composition information; an accessory data supply section that supplies accessory data and setting information for the accessory data; and a synthesized file creation section that adds the accessory data and the setting information to the musical composition information without changing a recording format and substance of the musical composition information, to thereby create a musical composition information file comprising a combination of the musical composition information and the accessory data and the setting information.

The musical composition information may, for example, be a so-called "standard MIDI file", in which case the musical composition information is recorded in accordance with a predetermined standard. Examples of what can be recorded as a meta event in the standard MIDI file include textual data relating to the musical composition information, such as a text, copyright indication, sequence name/track name, name of a musical instrument, lyrics, etc. Thus, in one implementation of the present invention, the synthesized file creation section, using such meta events, can add, to the musical composition information, accessory data, such as message data (text data), unrelated to the musical composition information and setting information relating to display of the accessory data (e.g., various setting data relating to message data such as a displayed form, color and font, of a text), to thereby create a musical composition information file that comprises a combination of the musical composition information and the accessory data and the setting information. Consequently, by recording and/or transmitting the musical composition information file with the accessory data and setting information added thereto, the accessory data (including the setting information) and musical composition data can be handled as an integral unit.

The present invention also provides a device for reproducing data-containing musical composition information, which comprises: a composition information supply section that adds desired accessory data and setting information for the accessory data to musical composition information, to thereby supply a musical composition information file comprising a combination of the musical composition information and the accessory data and the setting information; a data extraction section that extracts the accessory data and the setting information from the musical composition information file supplied by the composition information supply section; a data reproduction processing section that executes data reproduction processing based on the accessory data and the setting information extracted from the musical composition information file; and a performance reproduction processing section that executes performance reproduction processing based on the musical composition information file. In this reproduction device, the composition information supply section supplies a musical composition information file comprising an integral combination of the musical composition information and created accessory data with setting information. The composition information supply section supplies the musical composition information file by reading it out from a recording medium or receiving it via a communication network. The data extraction section extracts only the accessory data and setting information, unrelated to the musical composition information, from among meta events in the musical composition information file. Because the thus-extracted accessory data and setting information are message data and the like, reproduction processing based on these data and information is carried out by the data reproduction processing section. For example, a message is visually reproduced on a video display screen or by printing in a particular format corresponding to the setting information. The performance reproduction processing section, on the other hand, executes performance reproduction processing based on the musical composition information. This way, on the basis of the musical composition information file handled as an integral unit, the processing corresponding to the accessory data and setting information therefor is executed simultaneously with the performance processing corresponding to the musical composition information.

The present invention also provides a system for transmitting/receiving data-containing musical composition information, which comprises: a composition information supply section that supplies musical composition information; an accessory data supply section that supplies accessory data and setting information for the accessory data; a synthesized file creation section that adds the accessory data and the setting information to the musical composition information without changing a recording format and substance of the musical composition information, to thereby create a musical composition information file comprising a combination of the musical composition information and the accessory data and the setting information; and a transmission/reception section that transmits or receives the musical composition information file having the accessory data and the setting information added thereto. Similarly to the above-mentioned musical composition information creation device, this transmitting/receiving system transmits or receives a musical composition information file containing accessory data, such as message data (text data), unrelated to the musical composition information, and setting information relating display of the accessory data (e.g., various setting data relating to message data such as a displayed form, color and font, of a text). Thus, at an receiving end, the message display processing and the performance processing can be executed simultaneously by just reproducing the musical composition information file.

According to still another aspect of the present invention, there is provided a machine-readable recording medium containing a musical composition information file. The musical composition information file stored in the medium includes a group of data of musical composition information containing performance information and a group of data of accessory information. The accessory information contains data indicative of its substance or contents and setting information, and the data group of the accessory information is inserted in the musical composition information file without changing a format and substance of the performance information. Thus, such a musical composition information file is provided in a recorded form which comprises a combination of the performance information and the accessory information.

The present invention can be arranged and practiced not only as a device invention but also a method or system invention. The present invention can also be practiced as a program for execution by a computer or DSP, as well as a recording medium storing such a program.

BRIEF DESCRIPTION OF THE DRAWINGS

For better understanding of the object and other features of the present invention, its preferred embodiments will be described in greater detail hereinbelow with reference to the accompanying drawings, in which:

FIGS. 7A and 7B are flow charts showing details of interrupt processing 1 and interrupt processing 2 carried out in synchronism with the composition information reproduction/reception processing of FIG. 6.

DETAILED DESCRIPTION OF THE PREFERRED EMBODIMENTS

Figure 2:
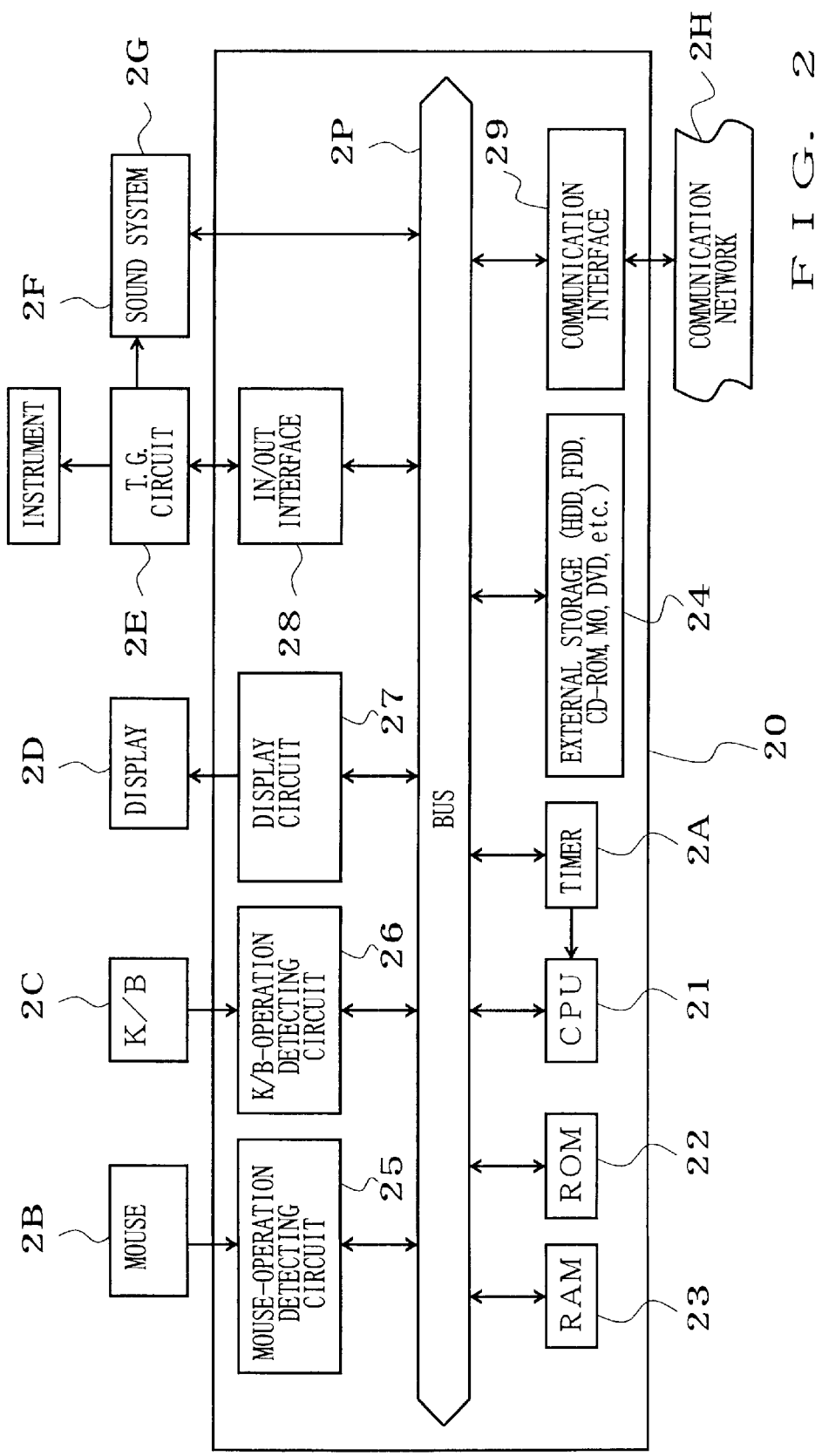
FIG. 2 is a block diagram illustrating a general hardware setup of the personal computer which functions as a device for creating data-containing musical composition information, a reproduction device for reproducing the data-containing musical composition information and a transmission/reception system for transmitting/receiving the data-containing musical composition information in accordance with the present invention.

FIG. 2 is a block diagram illustrating an example of a general hardware setup of a personal computer that functions as a device for creating data-containing musical composition information, a reproduction device for reproducing the data-containing musical composition information and a transmission/reception system for transmitting/receiving the data-containing musical composition information in accordance with the present invention. Operation of this personal computer 20 is controlled by a CPU 21, to which are connected, via a data and address bus 2P, a program memory (ROM) 22, a working memory (RAM) 23, an external storage device 24, a mouse-operation detecting circuit 25, a keyboard (K/B)-operation detecting circuit 26, a display circuit 27, an IN/OUT interface 28, a communication interface 29 and a timer 2A. Although the personal computer 20 may include other hardware components, the following description will be made in relation to a case where the personal computer 20 utilizes only the bare minimum resources as listed above.

On the basis of various programs and data stored in the program memory 22 and working memory 23 and data-containing musical composition (i.e., music piece) information introduced from the external storage device 24, the CPU 21 executes performance processing of the musical composition and other processing corresponding to the data attached to the musical composition information, in concurrent or parallel with each other. Here, the "data-containing musical composition information" is a MIDI file containing data relating to a message or other text file. In this embodiment, the external storage device 24 may comprise one or more of a floppy disk drive, a hard disk drive, a CD-ROM drive, a magneto-optical disk (MO) drive, a ZIP drive, a PD drive and a DVD drive. Alternatively, data-containing musical composition information or ordinary musical composition information may be introduced from an external MIDI instrument 2F or the like via the IN/OUT interface 28 and tone generator (T.G.) circuit 2E. The CPU 21 supplies the tone generator circuit 2E with the data-containing musical composition information thus introduced from the external storage device 24, so that the musical composition information is sounded or audible reproduced by means of an external sound system 2G.

The program memory 22, which is a read-only memory (ROM), has prestored therein various system-related programs for execution by the CPU 21 and various parameters and data. The working memory 23, which is for temporarily storing data generated as the CPU 21 executes the programs, is allocated in predetermined address regions of a random access memory (RAM) and used as registers, flags, etc. Various data and desired operating program may be pre-stored in the external storage device 24 rather than in the above-mentioned internal ROM 22. The operating program and data prestored in the external storage device 24 may be transferred to the RAM 23 for storage therein. This arrangement will greatly facilitate version-up of the operating program, addition of a new operating program, etc.

Further, the personal computer 20 may be connected, via the communication interface 29, to a communication network 2H, such as a LAN (Local Area Network), the Internet or telephone network, for communication of the data (e.g., data-containing musical composition information) with a desired sever computer. Thus, a desired operating program and data can be downloaded from the server computer. In such a case, the personal computer 20, as a "client", sends a command requesting the server computer to download the desired operating program and various data by way of the communication interface 29 and communication network 2H. In response to the command, the server computer delivers the requested operating program and data to the requesting personal computer via the communication network 2H. The personal computer 20 receives the operating program and data sent via the communication interface 29 and store them into the RAM 23 or the like. In this way, the necessary downloading of the desired operating program and various data is completed in the personal computer 20.

Note that the present invention may be implemented by a commercially-available electronic musical instrument or the like having prestored therein the operating programs and data corresponding to the invention. In this case, the operating programs and data corresponding to the present invention may be stored in a recording medium, such as a CD-ROM or floppy disk, readable by the electronic musical instrument so that it can be supplied to users in the medium-recorded form.

Mouse-operation detecting circuit 25 of FIG. 2 converts each signal from the mouse 2B into position information and supplies the converted position information to the data and address bus 2P. Keyboard (K/B) 2C includes function keys and a plurality of keys for the user to enter textual information and the like to the personal computer. The keyboard 2C also includes a plurality of key switches provided in corresponding relations to the keys. The keyboard-operation detecting circuit 26, which includes key switch circuitry provided in corresponding relations to the keys of the keyboard 2C, outputs a key-event signal corresponding to a depressed key. In addition to these hardware switches, various button switches may be visually shown on a display 2D so that any one of the button switches can be selected via the mouse 2B on the basis of software processing. The display circuit 27 controls operation of the display 2D that may, for example, comprise a liquid crystal display (LCD).

The tone generator circuit 2E, which is capable of simultaneously generating tone signals in a plurality of channels, receives musical composition information (MIDI file) supplied via the data and address bus 2P and IN/OUT interface 28 and generates tone signals based on the received musical composition information. The tone generation channels to simultaneously generate the plurality of tone signals in the tone generator circuit 2E may be implemented by using a single circuit on a time-divisional basis or by providing a separate circuit for each of the channels. Further, any tone signal generation method may be used in the tone generator circuit 2E depending on an application intended. Each tone signal output from the tone generator circuit 2E is audibly reproduced or sounded via the sound system 2G including amplifiers and speakers. Effect circuit may be provided between the tone generator circuit 2E and the sound system 2G for imparting various effects to the tone signals; alternatively, the tone generator circuit 2E itself may include such an effect circuit. The timer 2A generates tempo clock pulses to count a specified time interval and setting a tempo at which the musical composition information is to be reproduced. The frequency of the tempo clock pulses generated by the timer 2A is adjustable by a tempo switch (not shown) included a group of switches on an operation panel. Each of the tempo clock pulses from the timer 2A is given to the CPU 21 as an interrupt command, so that the CPU 21 interruptively executes various operations for an automatic performance.

Figure 4A:
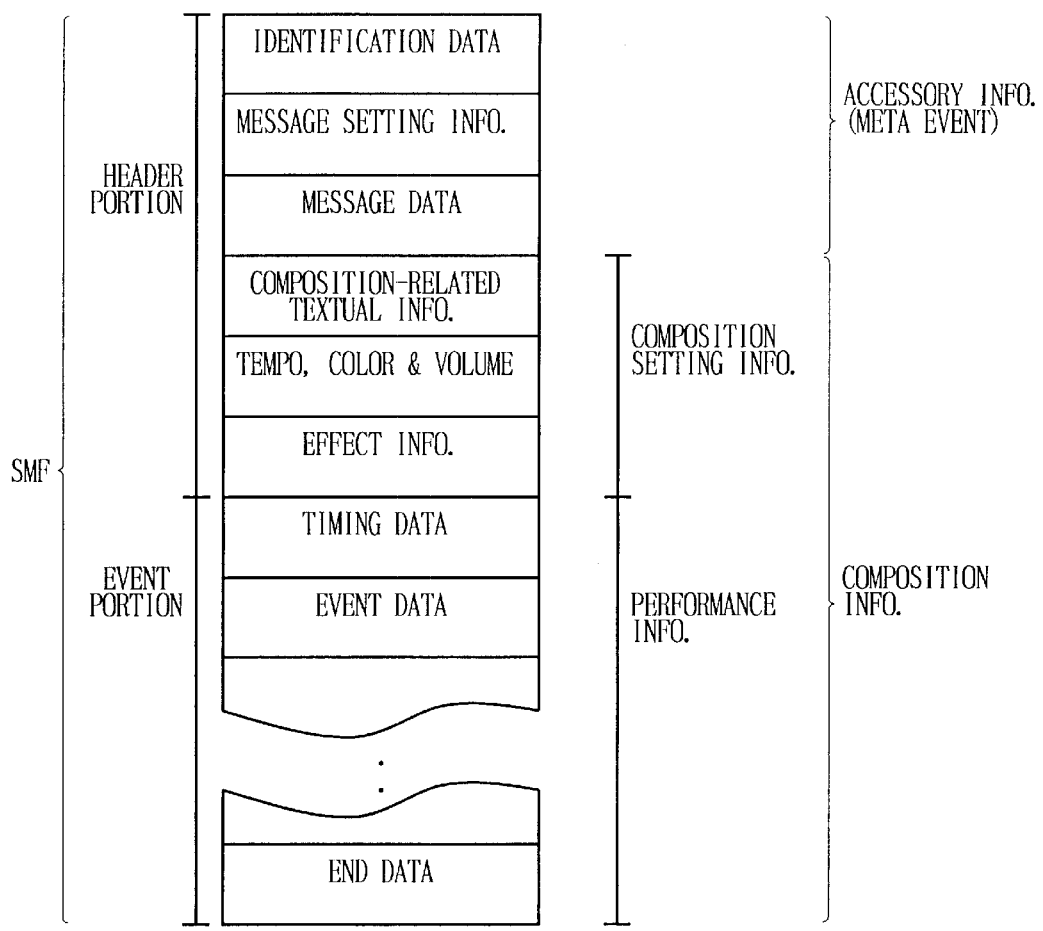
FIGS. 4A to 4C are diagrams showing exemplary recording formats of a data-containing MIDI file employed in a preferred embodiment of the present invention.
Figures 4B, 4C:
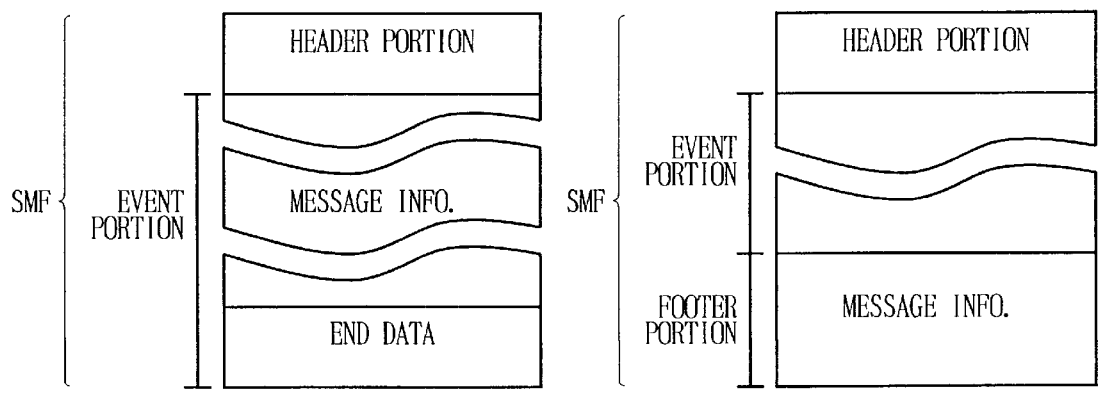

FIGS. 4A to 4C are diagrams showing exemplary recording formats of the data-containing MIDI file employed in the instant embodiment. The present embodiment will be described here in relation to a case where accessory information, such as a text file, is embedded in the MIDI file. Of course, any other information, such as an image file, a moving-image file, HTML information, information existing on a predetermined network or a combination of these information may be embedded in the MIDI file through similar processing.

FIG. 4A shows an example format where the accessory information is embedded, as meta events, in the header portion of a standard MIDI file (SMF), FIG. 4B shows another example format where the accessory information is embedded, as meta events, at intermediate locations in an event portion of the standard MIDI file, and FIG. 4C shows still another format example where the accessory information is embedded, as meta events, in the footer portion of the standard MIDI file. The standard MIDI file is recorded in a format conforming to a predetermined standard. Examples of what can be recorded as a meta event in the standard MIDI file include text data relating to musical composition information relating to a text, copyright indication, sequence name/track name, name of a musical instrument, lyrics, etc. Thus, the described embodiment is arranged to embed accessory data, such as message data (text data), unrelated to the standard MIDI file, in the standard MIDI file, using such meta events. The accessory information is made up of identification data, message setting information and message data. Of the accessory information, the identification data indicates that the following data is one relating to a message, and the message setting information includes data for setting various conditions of the message data such as a displayed form, color and font of a text. Further, the message data is textual data indicating substance or details of the message. Note that other information than textual data may of course be used in the embodiment. Further, with conventional sequencers that are not equipped with an accessory-information reproduction facility, only segments relating to the musical composition can be readily reproduced by just skipping segments relating to the accessory information. By thus embedding the message information, including user-desired message setting information, in the standard MIDI file as the meta events, it is possible to readily create a standard MIDI file containing various kinds of messages, and readily reproduce the thus-created message-containing MIDI standard file by use of a simplified reproduction device only capable of reproducing a conventional standard MIDI file. As a consequence, the message-containing MIDI standard file is equivalent to the conventional standard MIDI file and therefore can be used interchangeably with the conventional counterpart.

Like the conventional counterpart, the musical composition information employed in the embodiment is made up of a header portion including composition setting information, and an event portion including performance information. The composition setting information includes various pieces of information relating to various settings for a performance of the musical composition information; more specifically, the composition setting information includes composition-related textual information, information on a performance tempo, tone color and tone volume, and effect information. The composition-related textual information in the header portion is text data indicative of the names of the composer, lyric writer and, if any, arranger, the time when the composition was made, etc. The information on the performance tempo, tone color and tone volume is information for setting a performance tempo, tone color and tone volume at the beginning of the performance of the musical composition. The effect information is intended for setting an effect, such as echo, reverberation or panning, to be imparted during the performance of the musical composition. The performance information in the event portion comprises a combination of timing data and event data. The event data comprises tone generating data including a combination of key-on data, tone pitch data and velocity data, and tone deadening or muffling data including a combination of key-off data and tone pitch data. A plurality of such tone generating data and tone deadening data are stored in memory in the order corresponding to the progression of the musical composition, to together constitute a series of musical composition information. The timing data of the performance information indicates an time interval between successive events. Further, the key-on data is data indicative of a key-on event, while the key-off data is data indicative of a key-off event. The tone pitch data indicates a tone pitch to be turned on or turned off by depression or release of a keyboard key. The velocity data is data relating to a volume of a tone to be generated. Note that the musical composition information also includes other event data relating to pitch bend, volume control, etc.

Figure 1:
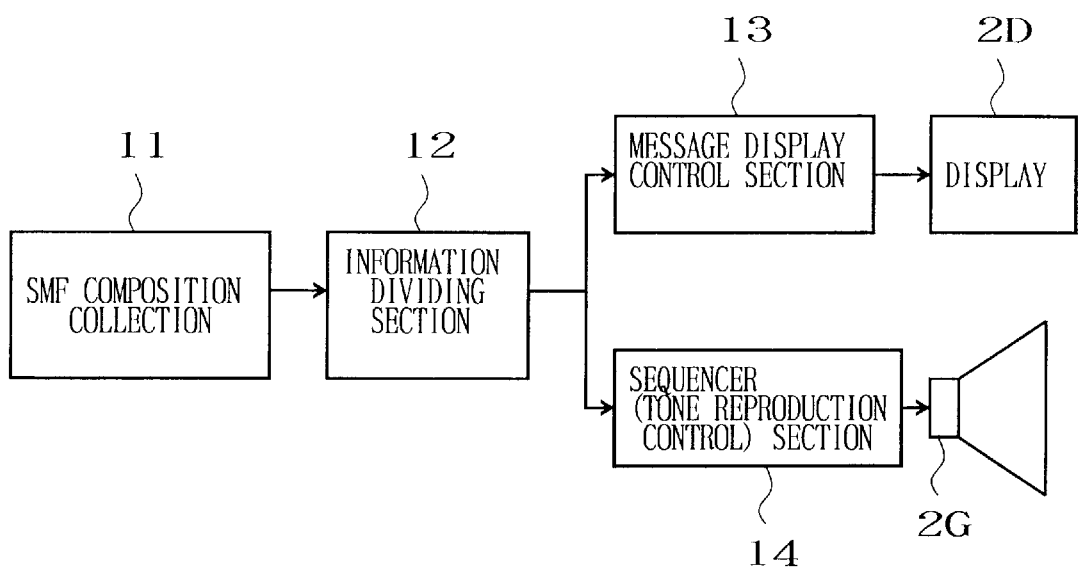
FIG. 1 is a block diagram showing an exemplary configuration of an application system in the case where a personal computer functions as a device for reproducing data-containing musical composition information in accordance with the present invention.
Figure 3:
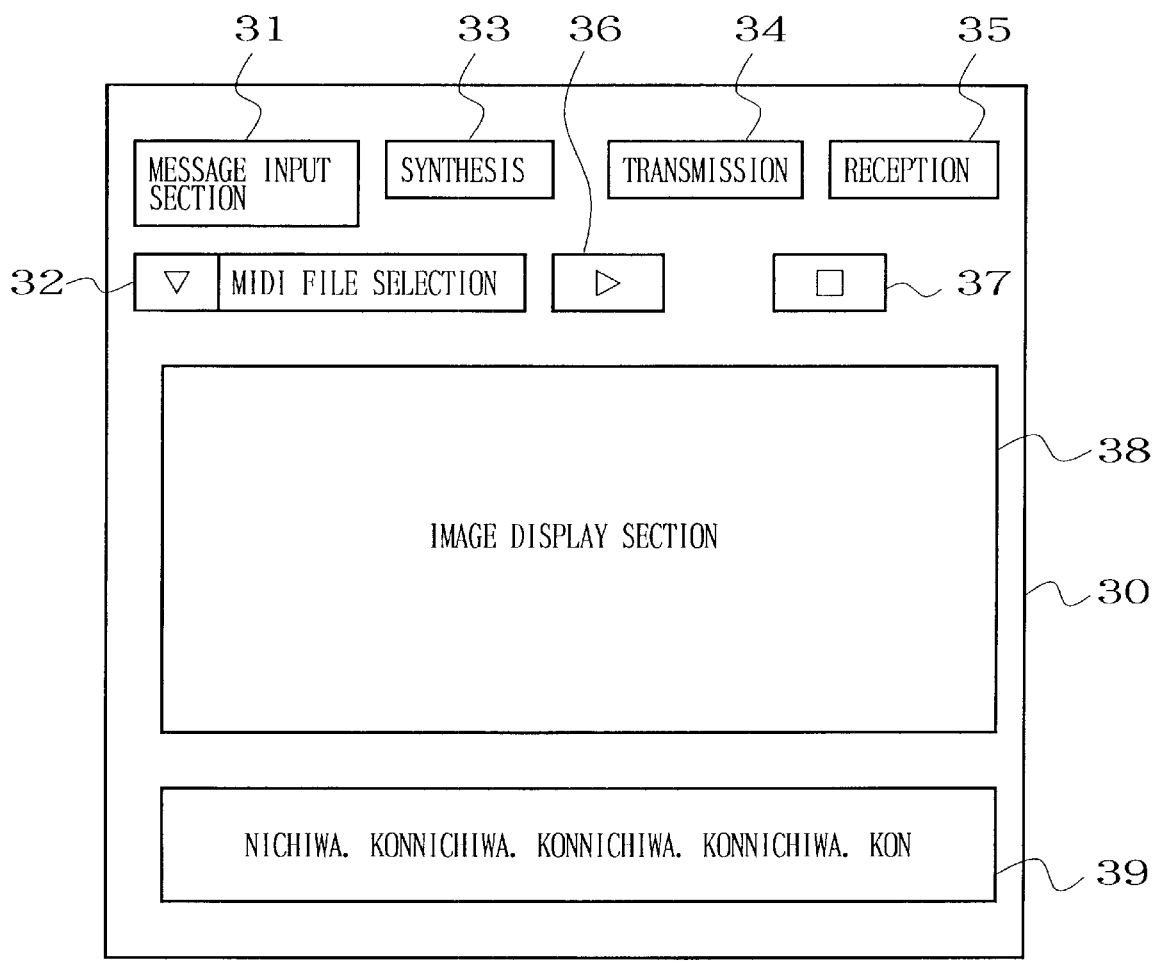
FIG. 3 is a diagram showing an exemplary screen shown on a video display when the application software for the devices and system for creating, reproducing and transmitting/receiving the data-containing musical composition information is initiated.
Figure 5:
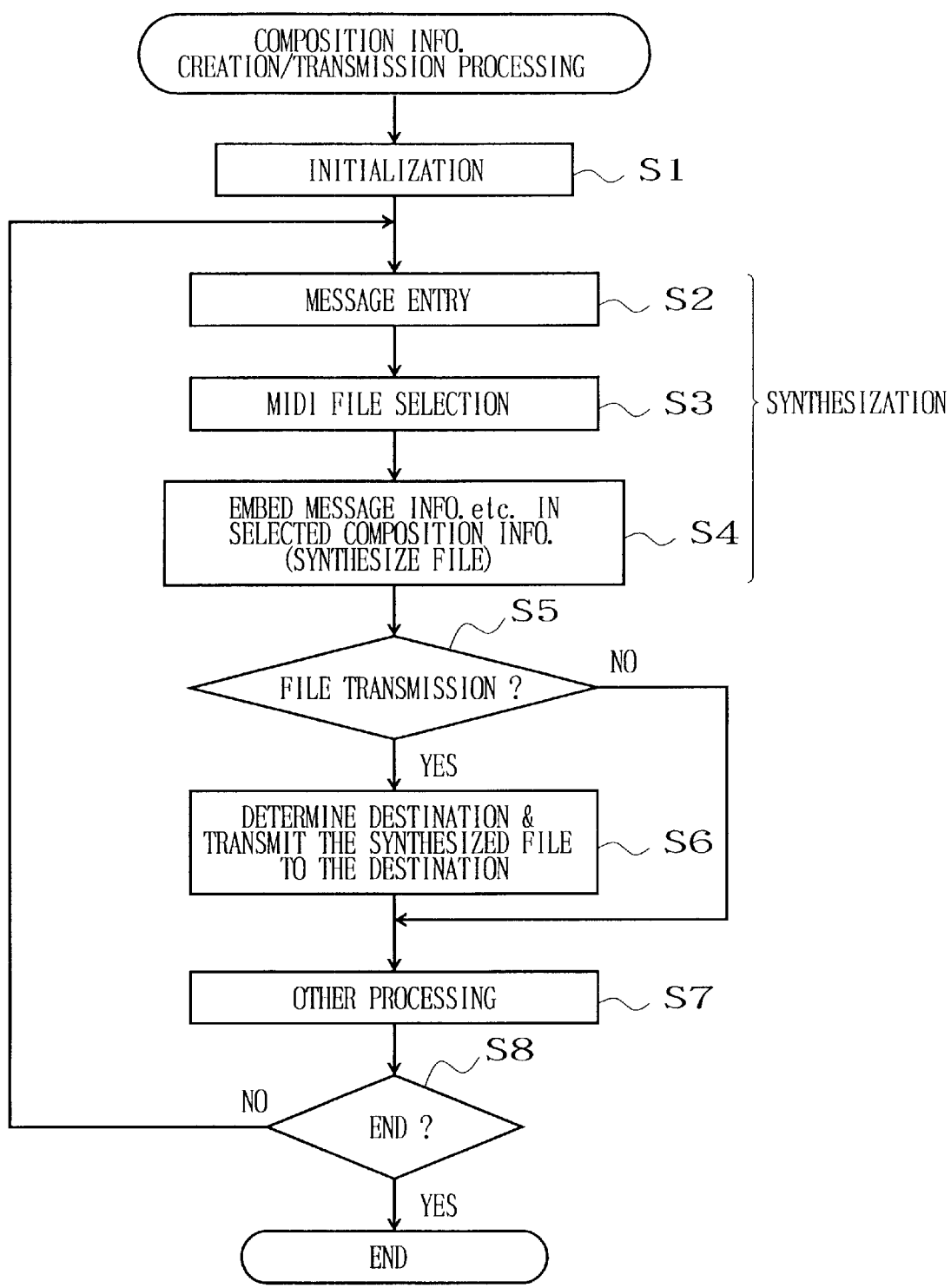
FIG. 5 is a flow chart showing an example of composition information creation/transmission processing carried out when the personal computer functions as the devices for creating and transmitting the data-containing musical composition information.
Figure 6:
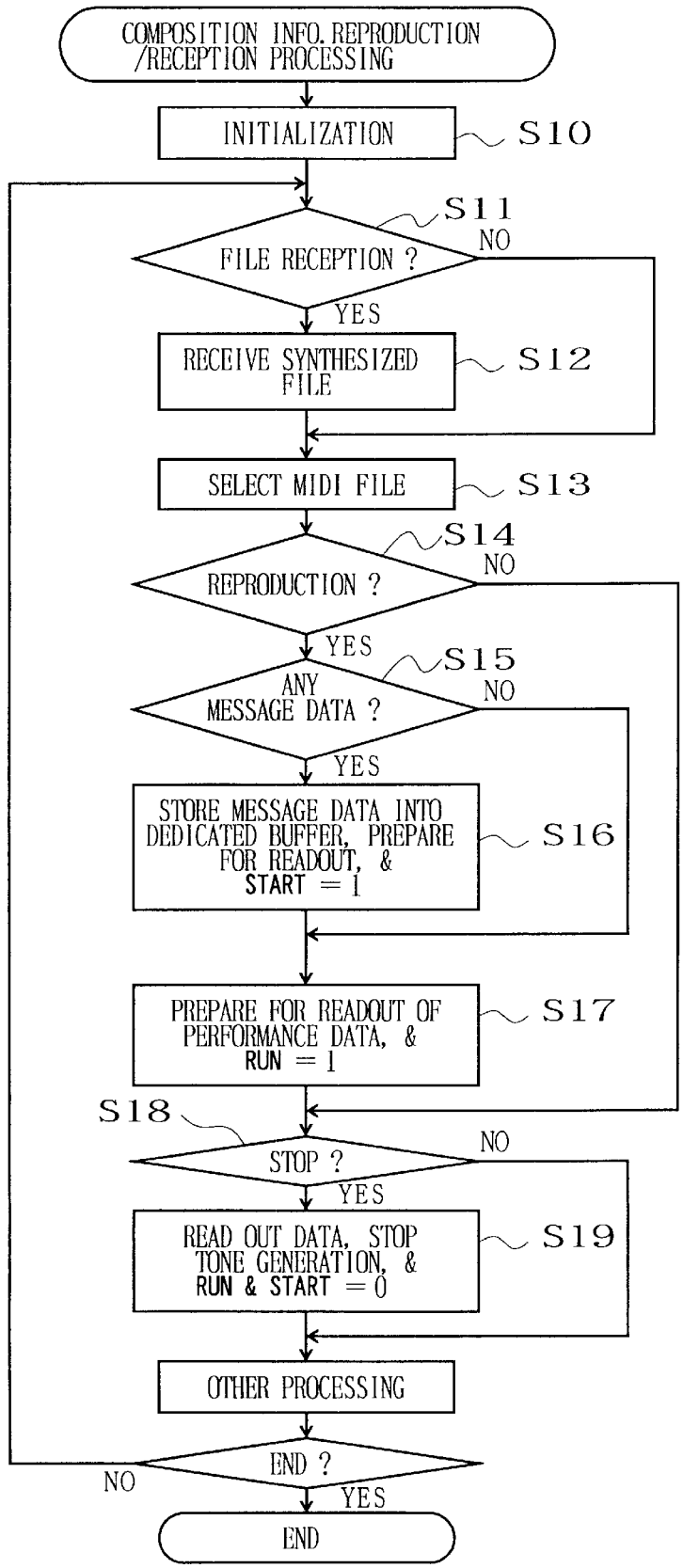
FIG. 6 is a flow chart showing an example of composition information reproduction/reception processing carried out when the personal computer functions as the devices for reproducing and receiving the data-containing musical composition information.

Now, with reference to FIGS. 1, 3 and 5 to 8, a description will be made about an embodiment where the personal computer 20 functions as the devices and system for creating, reproducing and transmitting/receiving the data-containing musical composition information. Specifically, FIG. 1 is a block diagram showing an exemplary configuration of an application system in the case where the personal computer 20 functions as the device for reproducing the data-containing musical composition information. FIG. 3 is a diagram showing an exemplary screen shown on the display 2D when the application software for the devices and system for creating, reproducing and transmitting/ receiving the data-containing musical composition information is initiated. FIG. 5 is a flow chart showing an example of composition information creation/transmission processing carried out when the personal computer 20 functions as the devices for creating and transmitting the data-containing composition information. FIG. 6 is a flow chart showing an example of composition information reproduction/reception processing carried out when the personal computer 20 functions as the devices for reproducing and receiving the data-containing musical composition information. Further, FIGS. 7A and 7B are flow charts showing details of interrupt processing 1 and interrupt processing 2 carried out in synchronism with the composition information reproduction/reception processing of FIG. 6.

In the personal computer 20, the screen of FIG. 3 shows up on the display 2D in response to the initiation of the application software for the devices and system for creating, reproducing and transmitting/receiving the data-containing musical composition information. The embodiment will be described below in relation to a situation where there are two program menus; a creation/transmission program for activating the devices for creating and transmitting the data-containing musical composition information; and a reproduction/reception program for activating the devices for reproducing and receiving the data-containing musical composition information. Here, after the initiation, the same screen 30 of FIG. 3 is displayed for both the creation/ transmission program and the reproduction/reception program. By the human operator or user operating a predetermined one of a message input section 31, MIDI file selecting section 32, synthesizing button 33, transmitting button 34, receiving button 35, reproducing button 36 and stop button 37, the personal computer 20 is allowed to function as the data-containing musical composition information creating device, data-containing musical composition information reproducing device or data-containing musical composition information transmitting/receiving system. The user's operation of the message input section 31, MIDI file selecting section 32 and various buttons 33 to 37 is limited in accordance with the program initiated. Although not specifically shown, another button is provided, at a suitable location on the screen, for cancelling the user's operation.

First, a description will be made about the case where the creation/transmission program is initiated for activating the data-containing musical composition information creating and transmitting devices. In response to the initiation of the creation/transmission program, the composition information creation/transmission processing is executed as flowcharted in FIG. 5. Namely, an initialization process is carried out at first step S1; more specifically, in this initialization process, the screen 30 of FIG. 3 is displayed, and the user's operation of the message input section 31, MIDI file selecting section 32, synthesizing button 33, transmitting button 34 is enabled while the user's operation of the receiving button 35, reproducing button 36 and stop button 37 is disabled.

After completion of the initialization process, the user or human operator uses the mouse and/or the like to enter a desired message using the displayed screen 30 (step S2) and select a particular MIDI file in which this message is to be embedded (step S3). The message input section 31 on the screen is a window for entering message data to be embedded in the standard MIDI file in such a manner as illustrated in FIGS. 4A to 4C. The message data, i.e., text data, thus entered into the message input section 31 is embedded in the selected standard MIDI file. In one implementation, the message input section 31 may be used to select a desired text file from among those prestored in a storage device, in which case each piece of information within the selected text file is inserted in the standard MIDI file as a meta event—any ordinary text file already created may also be readily used as a message. The MIDI file selecting section 32 includes buttons and window for selecting a MIDI file where the message data is to be embedded. Once the synthesizing button 33 is operated after the message is entered into the message input section 31 and the MIDI file is selected via the MIDI file selecting section 32, a synthesized file creation process is carried out at step S4 to synthesize or combine the MIDI file and the message data. The synthesized file creation process creates the inventive data-containing musical composition information, i.e., data-containing standard MIDI file, in the format as illustrated in FIGS. 4A to 4C. Although the MIDI file selection operation is shown, in the flow chart of FIG. 5, as carried out after the message entry operation, it may take place before the message entry operation as necessary. However, in case the synthesizing button 33 is operated before both the MIDI file selection operation and the message entry operation are not performed, a dialog is shown which instructs that the not-yet-performed operation (the message entry or MIDI file selection operation) be performed.

Once the transmitting button 34 is operated after the message is entered into the message input section 31 and the MIDI file is selected via the MIDI file selecting section 32, it is determined at step S5 that the file created by the synthesized file creation process is to be transmitted (YES determination). Then, a dialog is displayed for selecting a destination to which the synthesized file is to be transmitted, and the synthesized file, i.e., data-containing musical composition information, is transmitted to the destination upon selection of the destination (step S6). Note that the processing sometimes goes to an "other processing" step S7 without performing the transmission operation of step S6. The "other processing" step of FIG. 7 includes an operation for editing the message data within the synthesized file (data-containing musical composition information). If some MIDI file having message data already embedded therein is selected via the MIDI file selecting section 32, the embedded message can be revised as necessary. After completion of the "other processing" step of FIG. 7, a further determination is made at step S8 as to whether an end instruction has been given or not. With a negative determination at step S8, the creation/transmission processing reverts to step S2. The composition information creation/transmission processing comes to an end when the series of operations described above has been completed.

Next, a description will be made about the case where the reproduction/transmission program is initiated for activating the data-containing musical composition information reproducing and receiving devices. In response to the initiation of the reproduction/reception program, the composition information reproduction/reception processing is executed as flowcharted in FIG. 6. Namely, an initialization process is carried out at first step S10; more specifically, in this initialization process, the screen 30 of FIG. 3 is displayed, and the user's operation of the MIDI file selection section 32, receiving button 35, reproducing button 36 and stop button 37 is enabled while the user's operation of the message input section 31, synthesizing button 33, transmitting button 34 is disabled.

After completion of the initialization process, the user or human operator uses the mouse and/or the like to operate any of the receiving button 35, reproducing button 36 and stop button 37 and select a MIDI file to be reproduced. First, in response to the operation of the receiving button 35, a file is received, at steps S11 and S12, from a mail server on the communication network 2H via the communication interface 29. Of the received file, only a synthesized file (data-containing musical composition information), like the one described above, with mail-related header information and the like excluded therefrom is stored into a predetermined storage region. In a MIDI file selection process of step S13, a desired MIDI file is selected by the human operator operating the MIDI file selecting section 32 in a manner similar to the above-mentioned. Note that the MIDI file selecting section 32 in this composition information reproduction/reception processing is designed to display all stored MIDI files irrespective of whether they contain message data or not, although, in some case, only such MIDI files with message data embedded therein may be displayed. Further, if there is any MIDI file having never been opened ever since the receipt by the receiving device, the file may be displayed in such a manner that its "never opened" state can be recognized. Any one of these display modes may be selected as desired.

At next step S14, it is determined whether or not the reproducing button 36 has been operated. If answered in the affirmative, the following operations are carried out. Namely, when the reproducing button 36 has been operated after a MIDI file was selected via the MIDI file selecting section 32, a further determination is made at step S15 as to whether the selected MIDI file contains message data. If the selected MIDI file contains message data as determined at step S15 (YES determination), the message data is extracted from the MIDI file and stored into a dedicated buffer. Then, preparations are made for reading out the buffered data to display a message corresponding to the message setting information of the MIDI file, and a value "1" is set into a start flag START (step S16). Then, irrespective of whether the selected MIDI file contains message data or not, preparations are made for reading out the performance information on the basis of the message setting information of the MIDI file, and a value "1" is set into a run flag RUN (step S17). Namely, depending on whether message information is included in the file to be reproduced, an optimum process (reproduction of the music piece or reproduction of both the music piece and the message) is carried out automatically, thereby achieving an increased processing speed.

Interrupt processing 1 and interrupt processing 2 is executed in accordance with the respective states of the start flag START and run flag RUN. When the value "1" is stored in the run flag RUN, interrupt processing 1 sequentially reads out the timing data and event data from the information currently set in memory, so as to carry out tone reproduction processing. When the value "1" is stored in the start flag START, interrupt processing 2 displays a message on the basis of the message data stored in the dedicated buffer. In this way, an automatic performance can be carried out on the basis of the musical composition information of the MIDI file, and at the same time the message corresponding to the message information can be visually shown on a message display section 39 of FIG. 3. In the illustrated example of FIG. 3, a message "KONNICHIWA" is repetitively shown on the display screen 30 in a left-to-right stream. The displaying form of the message display section 39 in FIG. 3 is just illustrative, and the message may be displayed in any other suitable form. For example, the message may be displayed in a flashing or blinking fashion, or if the message is relatively long, only part of the message may be displayed. In another alternative, the text data may be audibly displayed by sound. Image display section 38 is arranged to show an image corresponding to some imagedesignating information previously contained in the message setting information; in this case, the image may be either moving or stationary. Note that if image information is embedded in the standard MIDI file as accessory information, then an image corresponding to the image information is shown on the image display section 38 of FIG. 3.

Finally, at step S18 of FIG. 6, it is determined whether or not the stop button 37 has been operated. If answered in the affirmative (YES), a value "0" is set into both the run flag RUN and the start flag START at step S19, in order to terminate the message data reading/tone generation processing. This causes no substantive operation to be performed any longer in interrupt processing 1 and interrupt processing 2. At an "other processing" step following step S19 or S18, there are carried out various other operations associated with the reproduction and reception of the musical composition information. Then, the composition information reproduction/reception processing is terminated in response to the user's operation of an end button.

FIG. 1 is a block diagram showing a system configuration in a situation where the personal computer 20 is caused to function as the data-containing musical composition information reproducing device by interrupt processing 1 and interrupt processing 2 of FIG. 7. As clearly seen from the figure, data-containing musical composition information is supplied from an SMF musical composition collection 11 that prestores standard MIDI files containing accessory information as illustrated in FIGS. 4A to 4C. The particular data-containing musical composition information read out from the SMF musical composition collection 11 is supplied to an information dividing section 12, where the data-containing musical composition information is divided into the accessory information and the musical composition information to be fed to a message display control section 13 and a sequencer section (tone reproduction control section) 14, respectively. The message display control section 13, which is implemented by interrupt processing 2, shows, on the display 2D, a message based on the message setting information and message data contained in the accessory information. The sequencer section (tone reproduction control section) 14, which is implemented by interrupt processing 1, carries out the tone generation processing based on the composition setting information and performance information contained in the musical composition information, so as to generate a tone signal to be audibly reproduced via the sound system 2G.

The preferred embodiment has been described above as carrying out the message display processing and the tone reproduction processing during interrupt processing 2 and interrupt processing 1, respectively, in an independent relation to each other. Information indicative of message display timing may of course be included in the message information. Further, whereas the embodiment has been described above as inputting a message to the message input section 31, a pre-made message file may be combined into desired musical composition information as by a "drag and drop" operation.

The performance information contained in the musical composition information may be in any other format than the MIDI format. Further, the automatic performance data may be in any desired format, such as: the "event plus absolute time" format where the time of occurrence of each performance event is represented by an absolute time within a measure; the "pitch (rest) plus note length" format where each performance data is represented by a pitch and length of a note or a rest and a length of the rest; or the "solid" format where a memory region is reserved for each minimum resolution of a performance and each performance event is stored in one of the memory regions that corresponds to the time of occurrence of the performance event. Further, the automatic performance data may include data of a plurality of channels in a mixed fashion or may include the data of each channel in a different track so as to be separate from the data of the other channels.

In summary, the present invention arranged in the above-described manner can provide novel musical composition information that permits simultaneous execution of the performance processing based on the MIDI file and the data processing for a message display or the like.

What is claimed is:

1. A device for creating data-containing musical composition information comprising:
    a composition information supply section that supplies musical composition information;
    an input section that inputs given words to said device in response to predetermined operation by a user;
    an accessory data supply section that supplies accessory data and setting information for setting a display of the accessory data, wherein the accessory data are text data and said text data represent the given words inputted via the predetermined operation by the user; and
    a synthesized file creation section that embeds the accessory data and the setting information to the musical composition information without changing the recording format or substance of the musical composition information, to thereby create a musical composition information file comprising a combination of the musical composition information, the accessory data, and the setting information for the accessory data.

2. A device as recited in claim 1, wherein the predetermined operation by the user is text input operation.

3. A device as recited in claim 1, wherein the predetermined operation by the user is selection operation for selecting a text file from among a plurality of prestored text files.

4. A device as recited in claim 1, wherein the accessory data further include image data.

5. A device for reproducing data-containing musical composition information comprising:
    a composition information supply section that supplies a musical composition information file comprising musical composition information having embedded therein accessory data and setting information for setting a display of the accessory data, wherein the accessory data are text data and said text data represent words inputted via predetermined operation by a user;
    a data extraction section that extracts the accessory data and the setting information from the musical composition information file;
    a data reproduction processing section that executes data reproduction processing based on the accessory data and the setting information; and
    a performance reproduction processing section that executes performance reproduction processing based on the musical composition information file.

6. A device as defined in claim 5 wherein said musical composition information file supplied by said composition information supply section is created by adding the accessory data and the setting information to the musical composition information without changing the recording format or substance of the musical composition information.

7. A device as recited in claim 5, wherein the predetermined operation by the user is text input operation.

8. A device as recited in claim 5, wherein the predetermined operation by the user is selection operation for selecting a text file from among a plurality of prestored text files.

9. A device as recited in claim 5, wherein the accessory data further include image data.

10. A system for transmitting or receiving data-containing musical composition information comprising:
- a composition information supply section that supplies musical composition information;
- an input section that inputs given words to said device in response to predetermined operation by a user;
- an accessory data supply section that supplies accessory data and setting information for setting a display of the accessory data, wherein the accessory data are text data and said text data represent the given words inputted via the predetermined operation by the user;
- a synthesized file creation section that embeds the accessory data and the setting information to the musical composition information without changing the recording format or substance of the musical composition information, to thereby create a musical composition information file comprising a combination of the musical composition information, the accessory data, and the setting information; and
- a transceiver section that transmits or receives the musical composition information file.

11. A system as recited in claim 10, wherein the predetermined operation by the user is text input operation.

12. A system as recited in claim 10, wherein the predetermined operation by the user is selection operation for selecting a text file from among a plurality of prestored text files.

13. A system as recited in claim 10, wherein the accessory data further include image data.

14. A method of creating data-containing musical composition information comprising:
- supplying musical composition information containing performance information;
- inputting given words in response to predetermined operation by a user;
- supplying accessory information, said accessory information containing data indicative of its substance and setting information for setting a display of the accessory data, wherein the accessory data are text data representing the given words inputted via the predetermined operation by the user; and
- embedding the accessory information in the musical composition information without changing the recording format or substance of the musical composition information, to thereby supply a musical composition information file comprising a combination of the performance information and the accessory information.

15. A method as recited in claim 14 which further comprises a step of transmitting, via a network, the musical composition information file supplied by said embedding.

16. A method as recited in claim 14 which further comprises a step of storing, in a recording medium, the musical composition information file supplied by said embedding.

17. A method of reproducing musical composition information having accessory information added thereto, said method comprising:
- a first step of supplying a musical composition information file, said musical composition information file containing performance information and accessory information, said accessory information having embedded therein accessory data and setting information for setting a display of the accessory data, wherein the accessory data are text data representing given words inputted via the predetermined operation by a user;
- a second step of extracting the accessory information from the musical composition information file supplied by said first step;
- a third step of executing reproduction processing based on the accessory information extracted by said second step; and
- a fourth step of executing performance reproduction processing based on the performance information contained in the supplied composition information file.

18. A method as recited in claim 17 wherein said first step includes a step of receiving the musical composition information file transmitted via a network.

19. A method as recited in claim 17 wherein said first step includes a step of reading out the musical composition information file stored in a storage medium.

20. A machine-readable recording medium containing a group of instructions of a program executable by a processor for creating musical composition information having accessory information added thereto, said program comprising:
- supplying musical composition information containing performance information;
- inputting given words in response to predetermined operation by a user;
- supplying accessory information, said accessory information containing data indicative of its substance and setting information for setting a display of the accessory data, wherein the accessory data are text data and said text data represent the given words inputted via the predetermined operation by the user; and
- inserting the accessory information in the musical composition information without changing a recording format and substance of the musical composition information, to thereby supply a musical composition information file comprising a combination of the performance information and the accessory information.

21. A machine-readable recording medium containing a group of instructions of a program executable by a processor for reproducing musical composition information having accessory information added thereto, said program comprising:
- a first step of supplying a musical composition information file, said musical composition information file comprising a file of musical composition information containing performance information and accessory information incorporated in the file, said accessory information containing accessory data and setting information for setting a display of the accessory data, wherein the accessory data are text data representing words inputted via predetermined operation by a user;
- a second step of extracting the accessory information from the musical information being unrelated to the musical composition;
- a third step of executing reproduction processing based on the accessory information extracted by said second step; and
- a fourth step of executing performance reproduction processing based on the performance information contained in the supplied musical composition information file.

22. A system for transmitting data-containing musical composition information comprising:

a composition information supply section that supplies musical composition information;

an input section that inputs given words to said device in response to predetermined operation by a user;

an accessory data supply section that supplies accessory data and setting information for setting a display of the accessory data, wherein the accessory data are text data and said text data represent the given words inputted via the predetermined operation by the user;

a synthesized file creation section that embeds the accessory data and the setting information to the musical composition information without changing a recording format and substance of the musical composition information, to thereby create a musical composition information file comprising a combination of the musical composition information and the accessory data and the setting information; and a transmission section that transmits, via a network, the created musical composition information file.

23. A system as recited in claim 22, wherein the predetermined operation by the user is text input operation.

24. A system as recited in claim 22, wherein the predetermined operation by the user is selection operation for selecting a text file from among a plurality of prestored text files.

25. A system as recited in claim 22, wherein the accessory data further include image data.

26. A system for receiving data-containing musical composition information comprising:

a reception section that receives, via a network, a musical composition information file comprising musical composition information having embedded therein accessory data and setting information for setting a display of the accessory data, wherein the accessory data are text data and said text data represent words inputted via predetermined operation by a user; and a data extraction section that extracts the accessory data and the setting information from the received musical composition information file.

27. A system as recited in claim 26, wherein the predetermined operation by the user is text input operation.

28. A system as recited in claim 26, wherein the predetermined operation by the user is selection operation for selecting a text file from among a plurality of prestored text files.

29. A system as recited in claim 26 wherein the accessory data further include image data.

30. A device for creating data-containing musical composition information comprising:

a composition information receiving section that receives musical composition information;

an accessory data receiving section that receives accessory data, said accessory data being tagged text data; and an insertion section that inserts the received accessory data in the received musical composition information without changing a recording format or substance of the musical composition information, to thereby create a musical composition information file comprising a combination of the musical composition information and the accessory data.

31. A device for creating data-containing musical composition information of claim 30, wherein said accessory data is in HyperText Markup Language (HTML) format.

32. The device for creating data-containing musical composition information of claim 30, wherein said accessory data is in a markup language format for use in conjunction with an internet and by which predetermined commands are defined.

33. A device for reproducing data-containing musical composition information comprising:

a composition information receiving section that receives a musical composition information file comprising a combination of musical composition information and accessory data, said accessory data being tagged text data;

an extracting section that extracts the accessory data from the received musical composition information file;

an execution section that executes data reproduction processing based on the accessory data extracted from the musical composition information file; and an execution section that executes performance reproduction processing based on the musical composition information file.

34. A device for reproducing data-containing musical composition information according to claim 33, wherein said accessory data is in HyperText Markup Language (HTML) format.

35. The device for reproducing data-containing musical composition information according to claim 33, wherein said accessory data is in a markup language format for use in conjunction with an internet and by which predetermined commands are defined.

36. A system for transmitting/receiving data-containing musical composition information comprising:

a composition information receiving section that receives musical composition information;

an accessory data receiving section that receives accessory data, said accessory data being tagged text data;

an insertion section that inserts the received accessory data in the received musical composition information without changing a recording format or substance of the musical composition information, to thereby create a musical composition information file comprising a combination of the musical composition information and the accessory data; and a transceiver section that transmits or receives, via a network, the musical composition information file having the musical information and the accessory data inserted therein.

37. The system for transmitting/receiving data according to claim 36, wherein said accessory data is in HyperText Markup Language (HTML) format.

38. The system for transmitting/receiving data-containing musical composition information according to claim 36, wherein said accessory data is in a markup language format for use in conjunction with an internet and by which predetermined commands are defined.

39. A method of creating data-containing musical composition information comprising the steps of:

supplying musical composition information;

supplying accessory data, said accessory data being tagged text data; and inserting the supplied accessory data in the supplied musical composition information without changing a recording format or substance of the musical composition information, to thereby create a musical composition information file comprising a combination of the musical composition information and the accessory data.

40. The method of creating data-containing musical composition information of claim 39, wherein said accessory data is in HyperText Markup Language (HTML) format.

41. The method of creating data-containing musical composition information of claim 39, wherein said accessory data is in a markup language format for use in conjunction with an internet and by which predetermined commands are defined.

42. A method of reproducing data-containing musical composition information comprising the steps of:

receiving a musical composition information file comprising a combination of musical composition information and accessory data, the accessory data being tagged text data;

extracting the accessory data from the received musical composition information file;

executing data reproduction processing based on the accessory data extracted from the musical composition information file; and executing performance reproduction processing based on the musical composition information file.

43. The method of reproducing data-containing musical composition information of claim 42, wherein said accessory data is in a markup language format for use in conjunction with an internet and by which predetermined commands are defined.

44. A method of reproducing data-containing musical composition information comprising the steps of:

receiving a musical composition information file comprising a combination of musical composition information and accessory data, the accessory data including command that facilitates connection to an internet;

extracting the accessory data from the received musical composition information file;

executing data reproduction processing based on the accessory data extracted from the musical composition information file; and executing performance reproduction processing based on the musical composition information file, wherein said accessory data is in HyperText Markup Language (HTML) format.

45. A method of transmitting/receiving data-containing musical composition information comprising the steps of:

supplying musical composition information;

supplying accessory data, the accessory data being tagged text data;

inserting the supplied accessory data in the supplied musical composition information without changing a record format or substance of the musical composition information, to thereby create a musical composition information file comprising a combination of the musical composition information and the accessory data; and transmitting or receiving, via a network, the musical composition information file having the musical information and the accessory data inserted therein.

46. The method of transmitting/receiving data-containing musical composition information according to claim 45, wherein said accessory data is in a markup language format for use in conjunction with an internet and by which predetermined commands are defined.

47. A method of transmitting/receiving data-containing musical composition information comprising the steps of:

supplying musical composition information;

supplying accessory data, the accessory data including command that facilitates connection to an internet;

inserting the supplied accessory data in the supplied musical composition information without changing a record format or substance of the musical composition information, to thereby create a musical composition information file comprising a combination of the musical composition information and the accessory data; and transmitting or receiving, via a network, the musical composition information file having the musical information and the accessory data inserted therein, wherein said accessory data is in HyperText Markup Language (HTML) format.

48. A machine-readable storage medium containing a group of instructions to cause said machine to implement a method for creating data-containing musical composition information, said method comprising the steps of:

supplying musical composition information;

supplying accessory data, said accessory data being tagged text data; and inserting the supplied accessory data in the supplied musical composition information without changing a recording format or substance of the musical composition information, to thereby create a musical composition information file comprising a combination of the musical composition information and the accessory data.

49. A machine-readable storage medium containing a group of instructions to cause said machine to implement a method for creating data-containing musical composition information, said method comprising the steps of:

supplying musical composition information;

supplying accessory data, said accessory data including command that facilitates connection between said machine and an internet destination; and inserting the supplied accessory data in the supplied musical composition information without changing a recording format or substance of the musical composition information, to thereby create a musical composition information file comprising a combination of the musical composition information and the accessory data, wherein said accessory data is in HyperText Markup Language (HTML) format.

50. A machine-readable storage medium containing a group of instructions to cause said machine to implement a method for reproducing data-containing musical composition information, said method comprising the steps of:

receiving a musical composition information file comprising a combination of musical composition information and accessory data, the accessory data being tagged text data;

extracting the accessory data from the received musical composition information file;

executing data reproduction processing based on the accessory data extracted from the musical composition information file; and executing performance reproduction processing based on the musical composition information file.

51. A machine-readable storage medium containing a group of instructions to cause said machine to implement a method for transmitting/receiving data-containing musical composition information, said method comprising the steps of:

supplying musical composition information;

supplying accessory data, said accessory data being tagged text data;

inserting the supplied accessory data in the supplied musical composition information without changing a recording medium format or substance of the musical composition information, to thereby create a musical composition information file comprising a combination of the musical composition information and the accessory data; and transmitting or receiving, via a network, the musical composition information having the musical information and the accessory data inserted therein.

52. A machine-readable storage medium containing a group of instructions to cause said machine to implement a method for transmitting/receiving data-containing musical composition information, said method comprising the steps of:

supplying musical composition information;

supplying accessory data, said accessory data including command that facilitates connection between said machine and an internet destination;

inserting the supplied accessory data in the supplied musical composition information without changing a recording medium format or substance of the musical composition information, to thereby create a musical composition information file comprising a combination of the musical composition information and the accessory data; and transmitting or receiving, via a network, the musical composition information having the musical information and the accessory data inserted therein wherein said accessory data is in HyperText Markup Language (HTML) format.

53. A device for creating data-containing musical composition information comprising:

a composition information supply section that supplies musical composition information;

an accessory data supply section that supplies accessory data and setting information for the accessory data, the accessory data being image data; and a synthesized file creation section that embeds the accessory data and the setting information to the musical composition information without changing the recording format or substance of the musical composition information, to thereby create a musical composition information file comprising a combination of the musical composition information, the accessory data, and the setting information for the accessory data.

54. A device for reproducing data-containing musical composition information comprising:

a composition information supply section that supplies a musical composition information file comprising a combination of musical composition information, accessory data and setting information for the accessory data, wherein the accessory data being image data;

a data extraction section that extracts the accessory data and the setting information from the musical composition information file;

a data reproduction processing section that executes data reproduction processing based on the accessory data and the setting information; and a performance reproduction processing section that executes performance reproduction processing based on the musical composition information file.

55. A system for transmitting data-containing musical composition information comprising:

a composition information supply section that supplies musical composition information;

an accessory data supply section that supplies accessory data and setting information for the accessory data, the accessory data being image data;

a synthesized file creation section that embeds the accessory data and the setting information to the musical composition information without changing a recording format and substance of the musical composition information, to thereby create a musical composition information file comprising a combination of the musical composition information and the accessory data and the setting information; and a transmission section that transmits, via a network, the created musical composition information file.

56. A system for receiving data-containing musical composition information comprising:

a reception section that receives, via a network, a musical composition information file having accessory data and setting information added thereto, the accessory data being image data, the composition information file being created by adding the accessory data and the setting information to the musical composition information without changing a recording format or substance of the musical composition information; and a data extraction section that extracts the accessory data and the setting information from the received musical composition information file.

* * * * *